United States Patent
Yang

(10) Patent No.: US 12,499,928 B2
(45) Date of Patent: Dec. 16, 2025

(54) MEMORY SYSTEM AND RECEIVER

(71) Applicant: NANYA TECHNOLOGY CORPORATION, New Taipei (TW)

(72) Inventor: Wu-Der Yang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 141 days.

(21) Appl. No.: 18/484,789

(22) Filed: Oct. 11, 2023

(65) Prior Publication Data

US 2025/0124967 A1    Apr. 17, 2025

(51) Int. Cl.
*G11C 11/4076* (2006.01)
*G11C 11/4093* (2006.01)
*H03K 19/20* (2006.01)

(52) U.S. Cl.
CPC ...... *G11C 11/4076* (2013.01); *G11C 11/4093* (2013.01); *H03K 19/20* (2013.01)

(58) Field of Classification Search
CPC .. G11C 11/4076; G11C 11/4093; H03K 19/20
USPC ........................................................ 365/193
See application file for complete search history.

(56) References Cited

U.S. PATENT DOCUMENTS

2011/0002180 A1*  1/2011  Song ............... G11C 7/1066
                                                 365/194
2024/0402915 A1* 12/2024  Chen ............... G06F 3/0619

FOREIGN PATENT DOCUMENTS

TW            I718719 B      2/2021

* cited by examiner

*Primary Examiner* — Fernando Hidalgo
(74) *Attorney, Agent, or Firm* — CKC & Partners Co., LLC

(57) ABSTRACT

A memory system includes a controller and a memory circuit. Controller outputs a first data strobe signal and a second data strobe signal. Memory circuit is coupled to controller, and is configured to receive first data strobe signal and second data strobe signal. Memory circuit includes a receiver. Receiver includes a logic conversion circuit. Logic conversion circuit is coupled to controller. When first and second data strobe signal are at the same voltage level, logic conversion circuit is configured to convert first second data strobe signals into third and fourth data strobe signals. Third data strobe signal and fourth data strobe signal converted by logic conversion circuit are at different voltage levels. When first and second data strobe signals are at different voltage levels, logic conversion circuit is configured to pass first and second data strobe signal and as third and fourth data strobe signals.

15 Claims, 8 Drawing Sheets

MEMORY SYSTEM AND RECEIVER

BACKGROUND

Field of Invention

The present disclosure relates to an electronic system and a device. More particularly, the present disclosure relates to a memory system and a receiver.

Description of Related Art

Conventional controllers are defined by different memory companies, and data strobe signals outputted by the controllers violate Joint Electron Device Engineering Council (JEDEC) memory standard at a standby stage (or called an undefined mode stage). The error data strobe signals will cause a memory circuit malfunctions.

For the foregoing reason, there is a need to provide a suitable memory system and a suitable receiver to solve the problems of the prior art.

SUMMARY

One aspect of the present disclosure provides a memory system. The memory system includes a controller and a memory circuit. The controller is configured to output a first data strobe signal and a second data strobe signal. The memory circuit is coupled to the controller, and is configured to receive the first data strobe signal and the second data strobe signal. The memory circuit includes a receiver. The receiver includes a logic conversion circuit. The logic conversion circuit is coupled to the controller. When the first data strobe signal and the second data strobe signal are at a same voltage level, the logic conversion circuit is configured to convert the first data strobe signal and the second data strobe signal into a third data strobe signal and a fourth data strobe signal. The third data strobe signal and the fourth data strobe signal converted by the logic conversion circuit are at different voltage levels. When the first data strobe signal and the second data strobe signal are at different voltage levels, the logic conversion circuit is configured to pass the first data strobe signal as the third data strobe signal, and is configured to pass the second data strobe signal as the fourth data strobe signal.

Another aspect of the present disclosure provides a receiver. The receiver includes an amplifier and a logic conversion circuit. The amplifier is configured to receive and amplify a first data strobe signal and a second data strobe signal from a controller. The logic conversion circuit is coupled to the amplifier. When the first data strobe signal and the second data strobe signal are at a same voltage level, the logic conversion circuit is configured to convert the first data strobe signal and the second data strobe signal into a third data strobe signal and a fourth data strobe signal. The third data strobe signal and the fourth data strobe signal converted by the logic conversion circuit are at different voltage levels. When the first data strobe signal and the second data strobe signal are at different voltage levels, the logic conversion circuit is configured to pass the first data strobe signal as the third data strobe signal, and is configured to pass the second data strobe signal as the fourth data strobe signal.

In view of the aforementioned shortcomings and deficiencies of the prior art, the present disclosure provides a memory system and a receiver to convert the same voltage level of data strobe signals to different levels and pass different voltage levels of data strobe signals defined by the JEDEC memory standard so as to make a memory chip or a memory circuit work properly.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
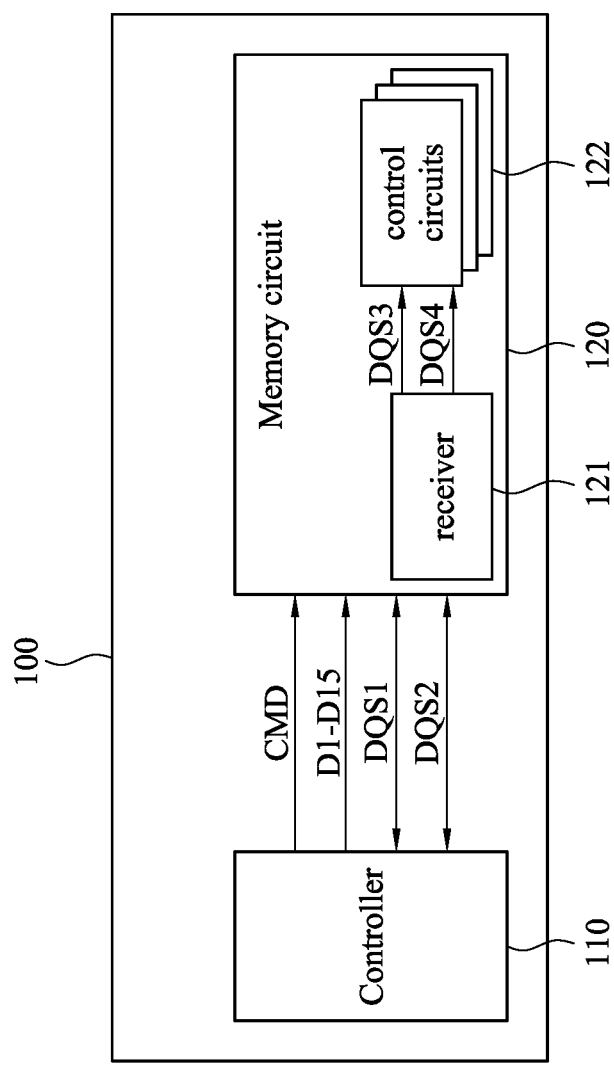
FIG. 1 depicts a schematic diagram of a memory system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 depicts a schematic diagram of a memory system 100 according to some embodiments of the present disclosure. In some embodiments, please refer to FIG. 1, the memory system 100 includes a controller 110 and a memory circuit 120. The controller 110 is coupled to the memory circuit 120. The controller 110 is configured to transmit a plurality of signals CMD and a plurality of data through data bus lines D1-D15. The memory circuit 120 includes a receiver 121 and a plurality of control circuits 122. The memory circuit 120 includes dynamic random-access memories (DRAM). In some embodiments, the signals CMD includes commands and a plurality of signals output by the controller 110.

The controller 110 is configured to generate data strobe signals DQS1 and DQS2 to the receiver 121 before the receiver 121 enters a preamble stage. The receiver 121 is configured to accurately distinguish each transmission cycle within one clock cycle according to the data strobe signals DQS1 and DQS2, so that the receiver 121 can receive plurality of data through the data bus lines D1-D15.

In some embodiments, the data strobe signals DQS1 and DQS2 respectively represent DQS_c and DQS_t defined by the JEDEC memory standard. The controller 110 can use the write leveling feature and feedback from the device to adjust the DQS (DQS_t, DQS_c) to CK (CK_t, CK_c) relationship. In detail, the controller is configured to use a rising edge or a falling edge of each of the data strobe signals DQS1 and DQS2 to sample states of clock signals. The terms "_t" and "_c" are used to represent the true and complement of a differential signal pair.

Then, DDR SDRAM stands for "Double Data Rate Synchronous DRAM". The term "double data rate" can be used for any product using both edges—high and low going—of periodically transitioning signal from "1" to "0" (or vice versa), for example clock or data strobe. DDR SDRAM uses bi-directional Data strobe (DQS) moving with DQs in parallel so that receivers of DDR SDRAM and memory controller can use DQS as a reference signal to fetch corresponding DQs. One DQS may reply for 4 or 8 bits of DQs. Fundamental benefit of using DQS is to realize high data transfer rate per pin through reducing access time of SDRAM and the propagation delay between DRAM and memory controller. Except them, we can also ignore the skew between the input clocks of DRAM and memory controller.

According to regulations defined by memory industry, such as Joint Electron Device Engineering Council (JEDEC), the data strobe signals DQS1 and DQS2 are required to be at a high level and at a low level (i.e., DQS1 is at a high level and DQS2 is at a low level) during a standby stage before a preamble stage. The preamble stage provides a timing window for receiving device to enable its data capture circuitry while a known/valid level is present on the data strobe signals, thus avoiding false triggers of the capture circuit. During the preamble stage and a later data-in stage, the data strobe signals DQS1 and DQS2 will varies between the high level and the low level. In practical applications, some manufacturers or product providers do not follow the JEDEC regulation, such that the data strobe signals DQS1 and DQS2 provided by these manufacturers will not be fixed at correct levels (i.e., DQS1 is at a high level and DQS2 is at a low level) during the standby stage.

In detail, during the standby stage before the preamble stage, the data strobe signals DQS1 and DQS2 outputted by the controller 110 (should be high and low according to JEDEC regulation) are now mistaken to be at the same voltage level, the data strobe signals DQS1 and DQS2 will cause the memory cell malfunctions. In order to avoid the malfunction on the memory cell, embodiments of the disclosure are configured to generate data strobe signals DQS3 and DQS4 based on the data strobe signals DQS1 and DQS2, and the data strobe signals DQS3 and DQS4 will follow the JEDEC regulation (i.e., DQS3 is at a high level and DQS4 is at a low level) during the standby stage.

Figure 2:
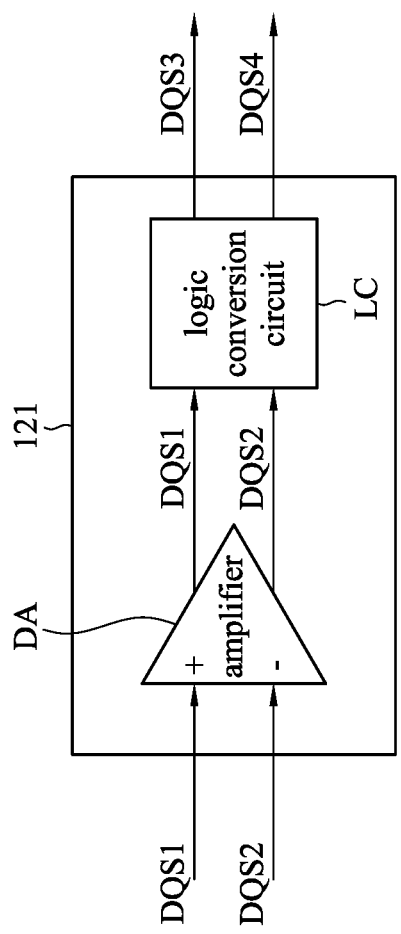
FIG. 2 depicts a schematic diagram of a receiver of a memory circuit of a memory system according to some embodiments of the present disclosure.

FIG. 2 depicts a schematic diagram of the receiver 121 of the memory circuit 120 of the memory system 100 in FIG. 1 according to some embodiments of the present disclosure. The receiver 121 includes an amplifier DA and a logic conversion circuit LC.

The amplifier DA is configured to receive and amplify the data strobe signals DQS1 and DQS2. In some embodiments, the amplifier DA includes a differential amplifier. The logic conversion circuit LC is coupled to the amplifier DA. In other words, the logic conversion circuit LC is configured to convert the data strobe signals DQS1 (e.g. 0 or 1) and DQS2 (e.g. 0 or 1) to data strobe signals DQS3 (e.g. 1) and DQS4 (e.g. 0).

Figure 3:
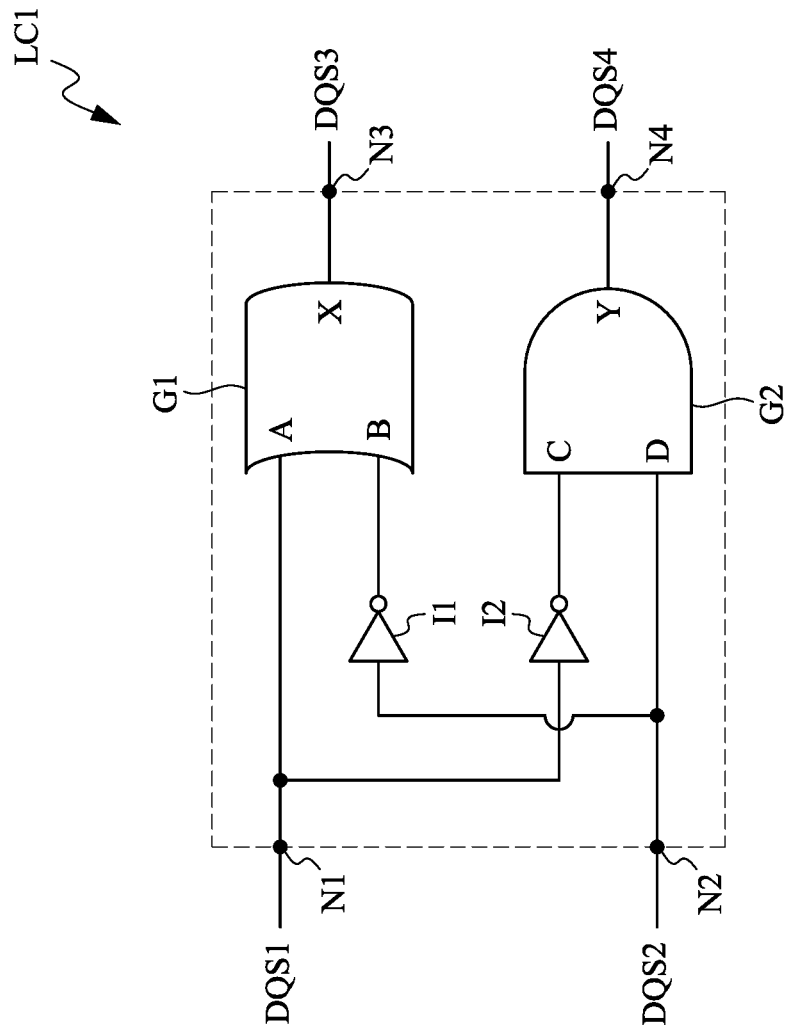
FIG. 3 depicts schematic diagrams of a logic conversion circuit of a receiver according to some embodiments of the present disclosure.

FIG. 3 depicts schematic diagram of a logic conversion circuit LC1 corresponding to the logic conversion circuit LC of the receiver 121 in FIG. 2 according to some embodiments of the present disclosure.

The logic conversion circuit LC1 includes an input terminal N1, an input terminal N2, an output terminal N3 and an output terminal N4. The input terminal N1 is configured to receive the data strobe signal DQS1. The input terminal N2 is configured to receive the data strobe signal DQS2. The output terminal N3 is configured to output the data strobe signal DQS3. The output terminal N4 is configured to output the data strobe signal DQS4.

The logic conversion circuit LC1 further includes an inverter 11, an inverter 12, a logic gate G1 and a logic gate G2. Please start form a top terminal and a right terminal of each of an element shown in the figure as a first terminal. Each of the inverter 11 and the inverter 12 includes a first terminal and a second terminal. The logic gate G1 includes an input terminal A, an input terminal B and an output terminal X. The logic gate G2 includes an input terminal C, an input terminal D and an output terminal Y. In some embodiments, the logic gate G1 includes an OR gate. The logic gate G2 includes an AND gate.

In some embodiments, the input terminal A of the logic gate G1 is coupled to the input terminal N1 of the logic conversion circuit LC1. The input terminal B of the logic gate G1 is coupled to the first terminal of the inverter 11. The second terminal of the inverter 11 is coupled to the input terminal N2 of the logic conversion circuit LC1. The output terminal X of the logic gate G1 is coupled to the output terminal N3 of the logic conversion circuit LC1.

The input terminal C of the logic gate G2 is coupled to the first terminal of the inverter 12. The second terminal of the inverter 12 is coupled to the input terminal N1 of the logic conversion circuit LC1. The input terminal D of the logic gate G2 is coupled to the input terminal N2 of the logic conversion circuit LC1. The output terminal Y of the logic gate G2 is coupled to the output terminal N4 of the logic conversion circuit LC1. The logic conversion circuit LC1. A truth table of the logic conversion circuit LC1 is listed as below.

TABLE 1

| data strobe signal DQS1 | data strobe signal DQS2 | data strobe signal DQS3 | data strobe signal DQS4 |
|---|---|---|---|
| 0 | 0 | 1 | 0 |
| 1 | 0 | 1 | 0 |
| 0 | 1 | 0 | 1 |
| 1 | 1 | 1 | 0 |

Figure 4:
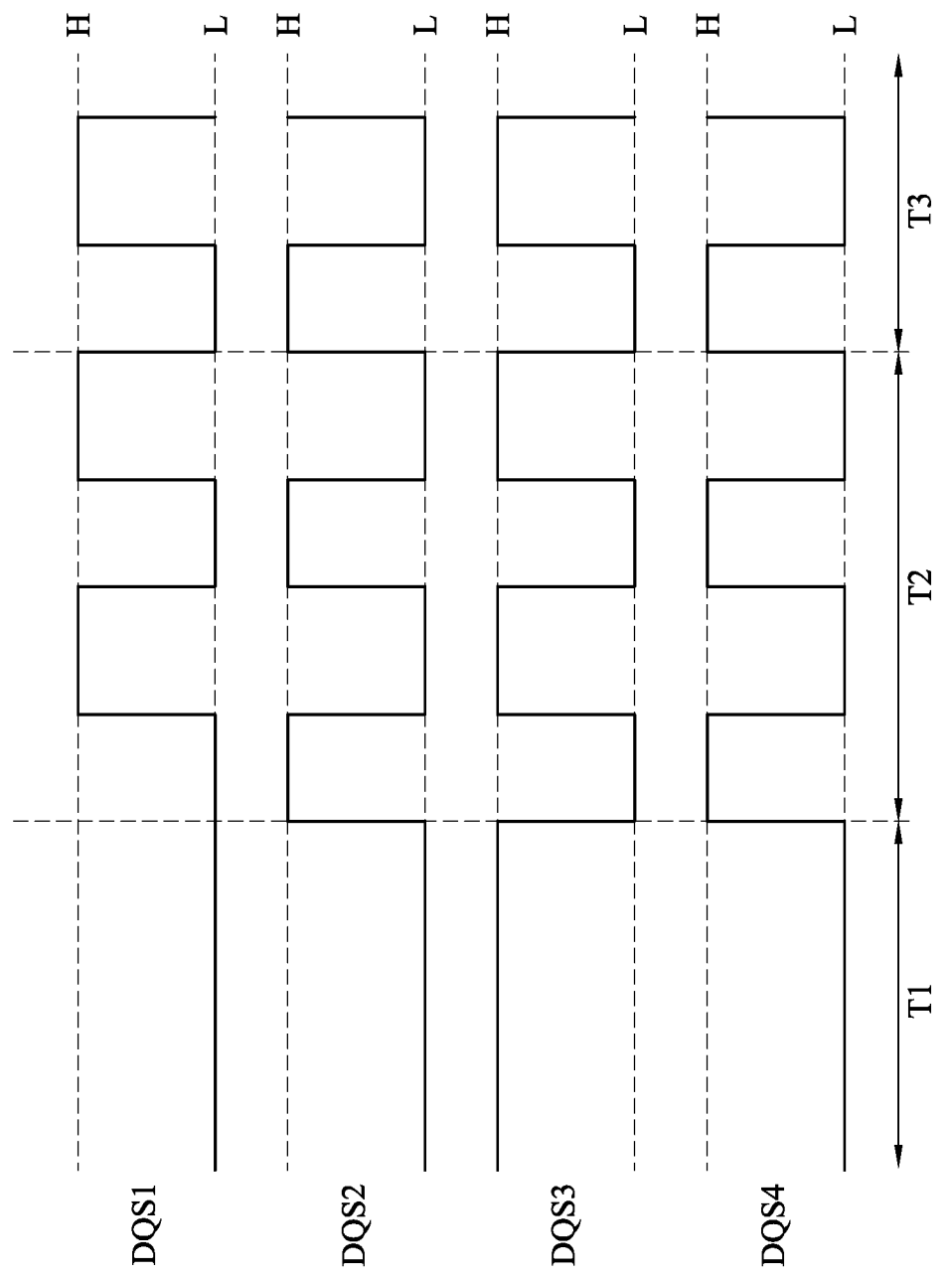
FIG. 4 depicts a signal timing diagram of data strobe signals according to some embodiments of the present disclosure.

FIG. 4 depicts a signal timing diagram of data strobe signals DQS1-DQS4 according to some embodiments of the present disclosure. The signal timing diagram includes a standby stage T1, a preamble stage T2, and a data-in stage T3.

Please refer to FIG. 3 and FIG. 4, the data strobe signals DQS1-DQS2 are at the same voltage level (e.g. a low level L) at the standby stage T1 by mistake.

In the standby stage T1, each of the data strobe signals DQS1 and the data strobe signal DQS2 is at the low level L. The logic conversion circuit LC1 is configured to convert the first data strobe signal DQS1 (e.g. the low level L) and the second data strobe signal DQS2 (e.g. the low level L) into the third data strobe signal DQS3 (e.g. the high level H) and the fourth data strobe signal DQS4 (e.g. the low level L). Voltage levels of the third data strobe signal DQS3 and the fourth data strobe signal DQS4 follow the JEDEC memory standard in the standby stage T1 before the preamble stage T2.

In the preamble stage T2 and the data-in stage T3, each of the first data strobe signal DQS1 and the second data strobe signal DQS2 switches between the high level H and the low level L. The logic conversion circuit LC1 is configured to pass the first data strobe signal DQS1 and the second data strobe signal DQS2 as the third data strobe signal DQS3 and the fourth data strobe signal DQS4 so that the logic conversion circuit LC1 does not affect an original operation in the preamble stage T2 and the data-in stage T3.

However, an embodiment of the present disclosure are not limited to that a voltage level of each of the data strobe signal DQS1 and the data strobe signal DQS2 is at the low level L in the standby stage T1 before the preamble stage T2. Voltage levels of the data strobe signal DQS1 and the data strobe signal DQS2 may both be at the high level H, and it will be discussed in the following paragraph.

Figure 5:
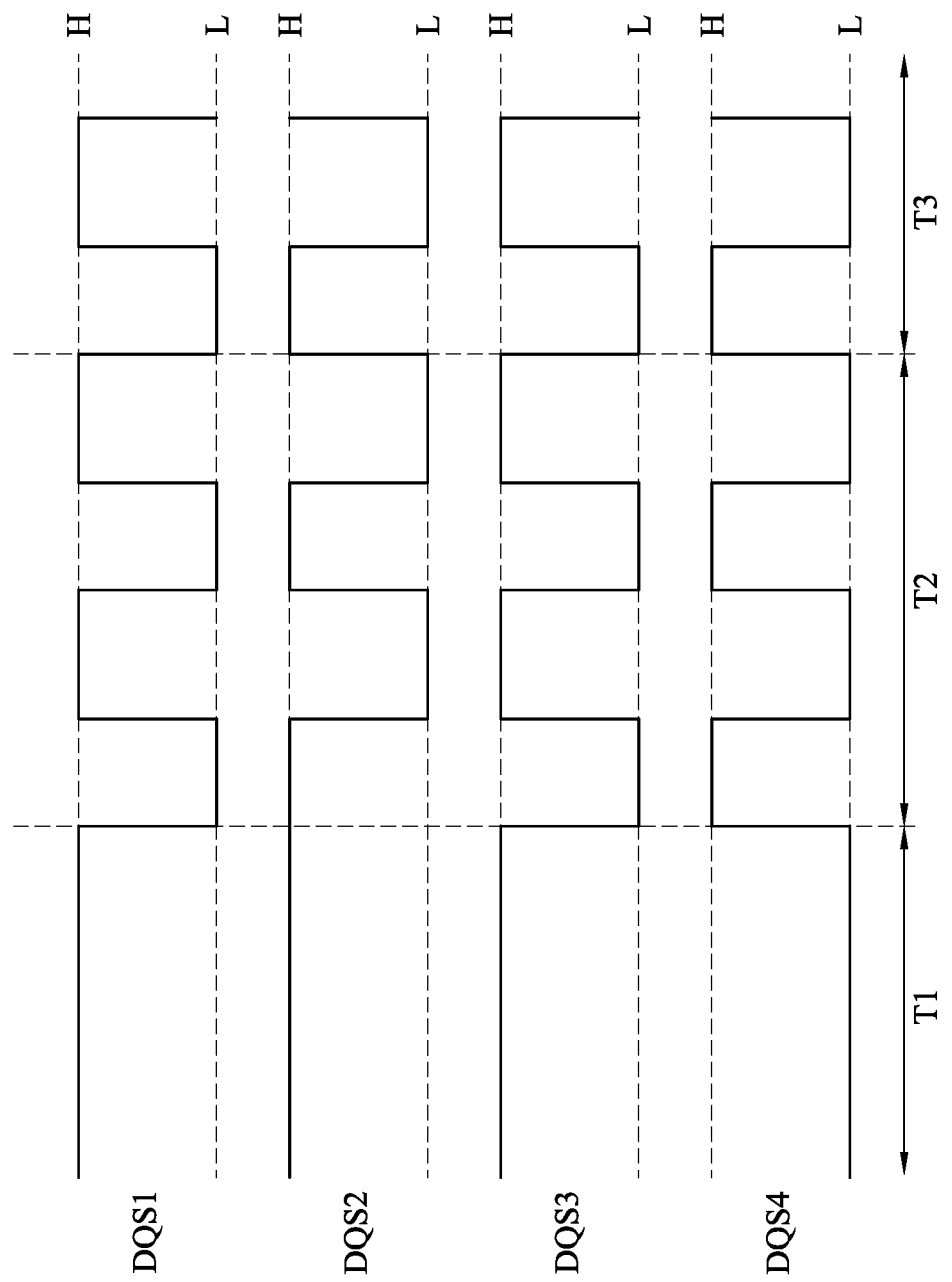
FIG. 5 depicts a signal timing diagram of data strobe signals according to some embodiments of the present disclosure.

FIG. 5 depicts a signal timing diagram of data strobe signals DQS1-DQS4 according to some embodiments of the present disclosure. The signal timing diagram includes a standby stage T1, a preamble stage T2, and a data-in stage T3.

Please refer to FIG. 3 and FIG. 5, the data strobe signals DQS1-DQS2 are at the same voltage level (e.g. the high level H) at the stage T1 by mistake.

In the standby stage T1, each of the data strobe signals DQS1 and the data strobe signal DQS2 is at a high level H. The logic conversion circuit LC1 is configured to convert the first data strobe signal DQS1 (e.g. the high level H) and the second data strobe signal DQS2 (e.g. the high level H) into the third data strobe signal DQS3 (e.g. the high level H) and the fourth data strobe signal DQS4 (e.g. the low level L). Voltage levels of the third data strobe signal DQS3 and the fourth data strobe signal DQS4 follow the JEDEC memory standard in the standby stage T1 before the preamble stage T2.

In the preamble stage T2 and the data-in stage T3, each of the first data strobe signal DQS1 and the second data strobe signal DQS2 switches between the high level H and the low level L. The logic conversion circuit LC1 is configured to pass the first data strobe signal DQS1 and the second data strobe signal DQS2 as the third data strobe signal DQS3 and the fourth data strobe signal DQS4 so that the logic conversion circuit LC1 does not affect an original operation in the preamble stage T2 and the data-in stage T3.

Figure 6:
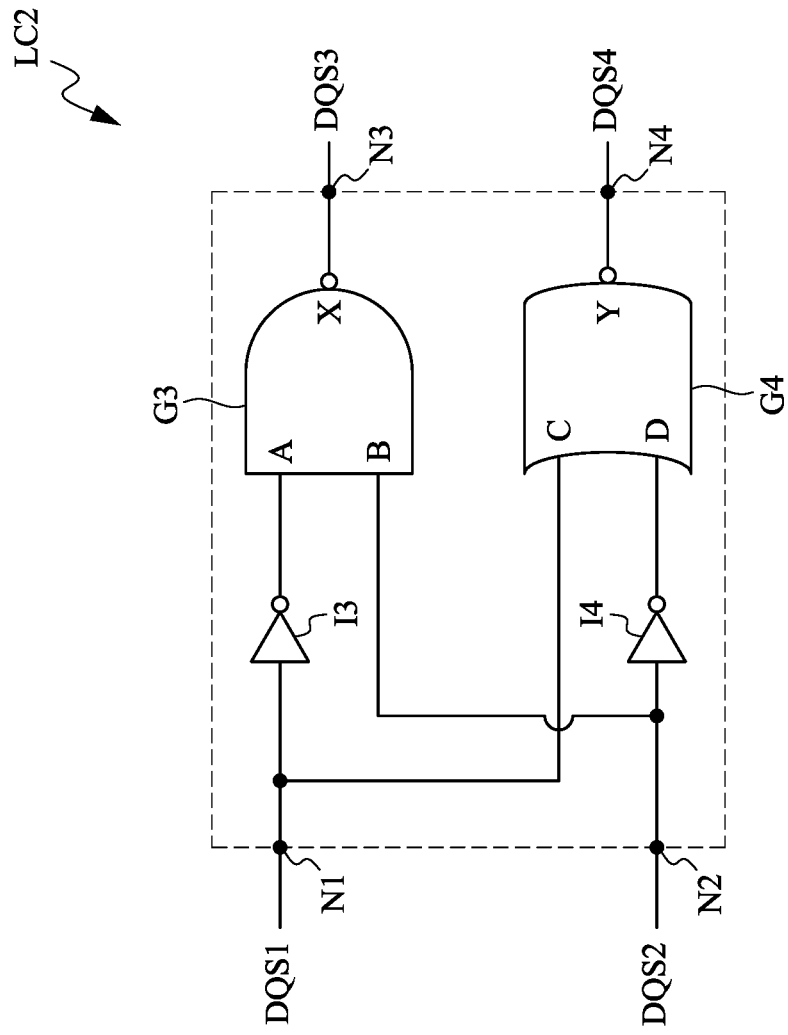
FIG. 6 depicts schematic diagrams of a logic conversion circuit of a receiver according to some embodiments of the present disclosure.

FIG. 6 depicts schematic diagram of a logic conversion circuit LC2 corresponding to the logic conversion circuit LC of the receiver 121 in FIG. 2 according to some embodiments of the present disclosure.

The logic conversion circuit LC2 includes an input terminal N1, an input terminal N2, an output terminal N3 and an output terminal N4. The input terminal N1 is configured to receive the data strobe signal DQS1. The input terminal N2 is configured to receive the data strobe signal DQS2. The output terminal N3 is configured to output the data strobe signal DQS3. The output terminal N4 is configured to output the data strobe signal DQS4.

The logic conversion circuit LC2 further includes an inverter 13, an inverter 14, a logic gate G3 and a logic gate G4. Each of the inverter 13 and the inverter 14 includes a first terminal and a second terminal. The logic gate G3 includes an input terminal A, an input terminal B and an output terminal X. The logic gate G4 includes an input terminal C, an input terminal D and an output terminal Y. In some embodiments, the logic gate G3 includes a NAND gate. The logic gate G4 includes a NOR gate.

In some embodiments, the input terminal A of the logic gate G3 is coupled to the first terminal of the inverter 13. The second terminal of the inverter 13 is coupled to the input terminal N1 of the logic conversion circuit LC2. The input terminal B of the logic gate G3 is coupled to the input terminal N2 of the logic conversion circuit LC2. The output terminal X of the logic gate G3 is coupled to the output terminal N3 of the logic conversion circuit LC2.

The input terminal C of the logic gate G4 is coupled to the input terminal N1 of the logic conversion circuit LC2. The input terminal D of the logic gate G4 is coupled to the first terminal of the inverter 14. The second terminal of the inverter 14 is coupled to the input terminal N2 of the logic conversion circuit LC2. The output terminal Y of the logic gate G4 is coupled to the output terminal N4 of the logic conversion circuit LC2. An operation of the logic conversion circuit LC2 is the same as an operation of the logic conversion circuit LC1. A truth table of the logic conversion circuit LC2 is the same as the table 1.

Figure 7:
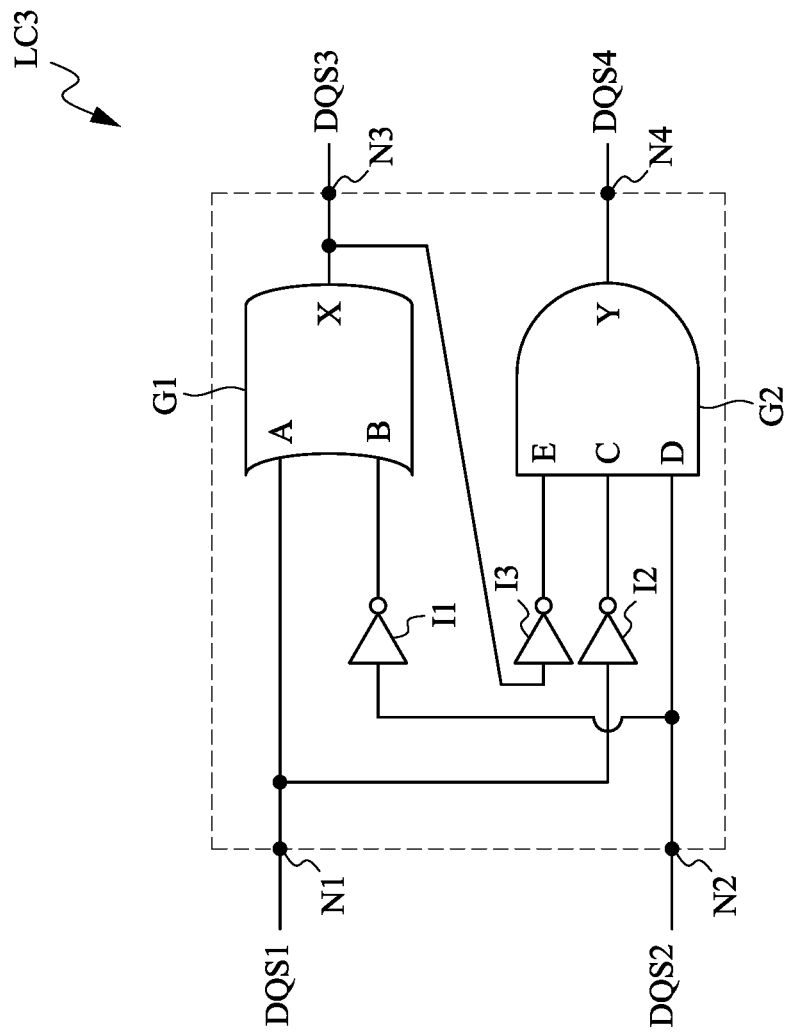
FIG. 7 depicts a schematic diagram of a logic conversion circuit of a receiver according to some embodiments of the present disclosure.

FIG. 7 depicts a schematic diagram of a logic conversion circuit LC3 corresponding to the logic conversion circuit LC of the receiver 121 in FIG. 2 according to some embodiments of the present disclosure. There are differences between the logic conversion circuit LC1 in FIG. 3 and the logic conversion circuit LC3 in FIG. 7. A first difference is that the logic conversion circuit LC3 further includes an inverter 13. A second difference is that the logic gate G2 further includes an input terminal E. A third difference is that the inverter 13 is coupled between the input terminal E of the logic gate G2 and the output terminal X of the logic gate G1. The rest circuit structure of the embodiment in FIG. 5 is the same as the circuit structure of the embodiment in FIG. 3, and detail repetitious are omitted here. An operation of the logic conversion circuit LC3 is the same as an operation of the logic conversion circuit LC1. A truth table of the logic conversion circuit LC3 is the same as the table 1.

Figure 8:
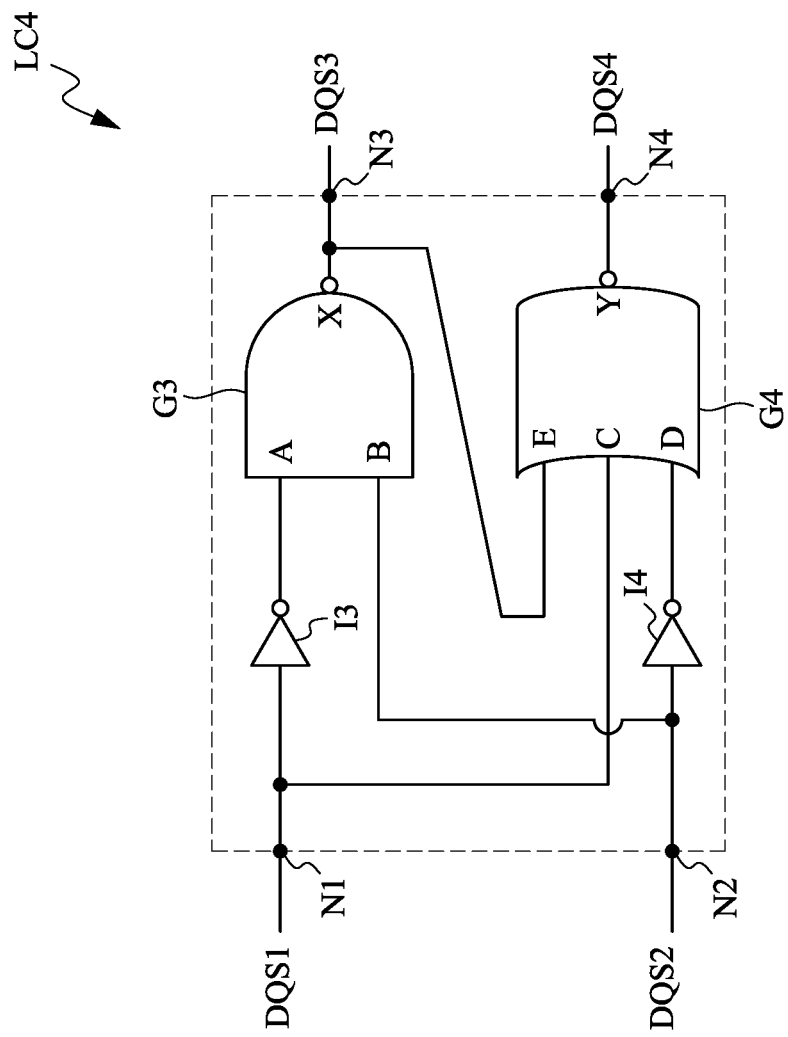
FIG. 8 depicts a schematic diagram of a logic conversion circuit of a receiver according to some embodiments of the present disclosure.

FIG. 8 depicts a schematic diagram of a logic conversion circuit LC4 corresponding to the logic conversion circuit LC of the receiver 121 in FIG. 2 according to some embodiments of the present disclosure.

There are differences between the logic conversion circuit LC4 in FIG. 8 and the logic conversion circuit LC2 in FIG. 6. A first difference is that the logic gate G4 further includes an input terminal E. A second difference is that the input terminal E of the logic gate G4 is coupled to the output terminal X of the logic gate G3. The rest circuit structure of the embodiment in FIG. 8 is the same as the circuit structure of the embodiment in FIG. 6, and detail repetitious are omitted here. An operation of the logic conversion circuit LC4 is the same as an operation of the logic conversion circuit LC1. A truth table of the logic conversion circuit LC4 is the same as the table 1.

In some embodiments, a Boolean algebra of each of the logic conversion circuits LC1-LC4 is listed as below according to the Table 1:

$$DQS3=DQS1\oplus\overline{DQS2}, DQS4=DQS2\otimes\overline{DQS1} \quad \text{formula 1}$$

Based on the aforementioned embodiments, the present disclosure provides a memory system and a receiver to convert the same level of data strobe signals to different levels and pass different levels of data strobe signals defined by the JEDEC memory standard so as to make a memory chip or a memory circuit work properly.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A memory system, comprising:
a controller, configured to output a first data strobe signal and a second data strobe signal; and
a memory circuit, coupled to the controller, and configured to receive the first data strobe signal and the second data strobe signal, wherein the memory circuit comprises a receiver, where the receiver comprises:
a logic conversion circuit, coupled to the controller, wherein when the first data strobe signal and the second data strobe signal are at a same voltage level, the logic conversion circuit is configured to convert the first data strobe signal and the second data strobe signal into a third data strobe signal and a fourth data strobe signal, wherein the third data strobe signal and the fourth data strobe signal converted by the logic conversion circuit are at different voltage levels,
wherein when the first data strobe signal and the second data strobe signal are at different voltage levels, the logic conversion circuit is configured to pass the first data strobe signal as the third data strobe signal, and is configured to pass the second data strobe signal as the fourth data strobe signal.

2. The memory system of claim 1, wherein the receiver further comprises:
an amplifier, coupled to the logic conversion circuit, configured to receive and amplify the first data strobe signal and the second data strobe signal.

3. The memory system of claim 2, wherein the logic conversion circuit comprises:
a first input terminal, configured to receive the first data strobe signal;
a second input terminal, configured to receive the second data strobe signal;
a first output terminal, configured to output the third data strobe signal;
a second output terminal, configured to output the fourth data strobe signal;

a first inverter, comprising:
a first terminal; and
a second terminal, coupled to the second input terminal of the logic conversion circuit; and
a second inverter, comprising:
a first terminal; and
a second terminal, coupled to the first input terminal of the logic conversion circuit.

4. The memory system of claim 3, wherein the logic conversion circuit further comprises:
a first logic gate, comprising:
a first input terminal, coupled to the first input terminal of the logic conversion circuit;
a second input terminal, coupled to the first terminal of the first inverter; and
an output terminal, coupled to the first output terminal of the logic conversion circuit; and
a second logic gate, comprising:
a first input terminal, coupled to the first terminal of the second inverter;
a second input terminal, coupled to the second input terminal of the logic conversion circuit; and
an output terminal, coupled to the second output terminal of the logic conversion circuit.

5. The memory system of claim 4, wherein the second logic gate further comprises a third input terminal, wherein the logic conversion circuit further comprises:
a third inverter, comprising:
a first terminal, coupled to the third input terminal; and
a second terminal, coupled to the output terminal of the first logic gate.

6. The memory system of claim 2, wherein the logic conversion circuit comprises:
a first input terminal, configured to receive the first data strobe signal;
a second input terminal, configured to receive the second data strobe signal;
a first output terminal, configured to output the third data strobe signal;
a second output terminal, configured to output the fourth data strobe signal;
a first inverter, comprising:
a first terminal; and
a second terminal, coupled to the first input terminal of the logic conversion circuit; and
a second inverter, comprising:
a first terminal; and
a second terminal, coupled to the second input terminal of the logic conversion circuit.

7. The memory system of claim 5, wherein the logic conversion circuit further comprises:
a first logic gate, comprising:
a first input terminal, coupled to the first terminal of the first inverter;
a second input terminal, coupled to the second input terminal of the logic conversion circuit; and
an output terminal, coupled to the first output terminal of the logic conversion circuit; and
a second logic gate, comprising:
a first input terminal, coupled to the first input terminal of the logic conversion circuit;
a second input terminal, coupled to the first terminal of the second inverter; and
an output terminal, coupled to the second output terminal of the logic conversion circuit.

8. The memory system of claim 7, wherein the second logic gate further comprises a third input terminal, wherein the third input terminal of the second logic gate is coupled to the output terminal of the first logic gate.

9. A receiver, comprising:
an amplifier, configured to receive and amplify a first data strobe signal and a second data strobe signal from a controller; and
a logic conversion circuit, coupled to the amplifier, wherein when the first data strobe signal and the second data strobe signal are at a same voltage level, the logic conversion circuit is configured to convert the first data strobe signal and the second data strobe signal into a third data strobe signal and a fourth data strobe signal, wherein the third data strobe signal and the fourth data strobe signal converted by the logic conversion circuit are at different voltage levels;
wherein when the first data strobe signal and the second data strobe signal are at different voltage levels, the logic conversion circuit is configured to pass the first data strobe signal as the third data strobe signal, and is configured to pass the second data strobe signal as the fourth data strobe signal.

10. The receiver of claim 9, wherein the logic conversion circuit comprises:
a first input terminal, configured to receive the first data strobe signal;
a second input terminal, configured to receive the second data strobe signal;
a first output terminal, configured to output the third data strobe signal;
a second output terminal, configured to output the fourth data strobe signal;
a first inverter, comprising:
a first terminal; and
a second terminal, coupled to the second input terminal of the logic conversion circuit; and
a second inverter, comprising:
a first terminal; and
a second terminal, coupled to the first input terminal of the logic conversion circuit.

11. The receiver of claim 10, wherein the logic conversion circuit further comprises:
a first logic gate, comprising:
a first input terminal, coupled to the first input terminal of the logic conversion circuit;
a second input terminal, coupled to the first terminal of the first inverter; and
an output terminal, coupled to the first output terminal of the logic conversion circuit; and
a second logic gate, comprising:
a first input terminal, coupled to the first terminal of the second inverter;
a second input terminal, coupled to the second input terminal of the logic conversion circuit; and
an output terminal, coupled to the second output terminal of the logic conversion circuit.

12. The receiver of claim 11, wherein the second logic gate further comprises a third input terminal, wherein the logic conversion circuit further comprises:
a third inverter, comprising:
a first terminal, coupled to the third input terminal; and
a second terminal, coupled to the output terminal of the first logic gate.

13. The receiver of claim 9, wherein the logic conversion circuit comprises:
a first input terminal, configured to receive the first data strobe signal;
a second input terminal, configured to receive the second data strobe signal;
a first output terminal, configured to output the third data strobe signal;
a second output terminal, configured to output the fourth data strobe signal
a first inverter, comprising:
a first terminal; and
a second terminal, coupled to the first input terminal of the logic conversion circuit; and
a second inverter, comprising:
a first terminal; and
a second terminal, coupled to the second input terminal of the logic conversion circuit.

14. The receiver of claim 13, wherein the logic conversion circuit further comprises:
a first logic gate, comprising:
a first input terminal, coupled to the first terminal of the first inverter;
a second input terminal, coupled to the second input terminal of the logic conversion circuit; and
an output terminal, coupled to the first output terminal of the logic conversion circuit; and
a second logic gate, comprising:
a first input terminal, coupled to the first input terminal of the logic conversion circuit;
a second input terminal, coupled to the first terminal of the second inverter; and
an output terminal, coupled to the second output terminal of the logic conversion circuit.

15. The receiver of claim 14, wherein the second logic gate further comprises a third input terminal, wherein the third input terminal of the second logic gate is coupled to the output terminal of the first logic gate.

* * * * *